(12) United States Patent
Kim

(10) Patent No.: US 8,696,005 B2
(45) Date of Patent: Apr. 15, 2014

(54) BUMPER STEP FOR HEAVY-DUTY TRUCK

(75) Inventor: Young Shin Kim, Guri-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/533,847

(22) Filed: Jun. 26, 2012

(65) Prior Publication Data
US 2013/0154229 A1 Jun. 20, 2013

(30) Foreign Application Priority Data

Dec. 14, 2011 (KR) .................. 10-2011-0134664

(51) Int. Cl.
*B60R 3/02* (2006.01)
(52) U.S. Cl.
USPC .......................... 280/163; 280/166
(58) Field of Classification Search
USPC ...................... 280/163, 164.1, 166
See application file for complete search history.

(56) References Cited

U.S. PATENT DOCUMENTS 4,623,160 A * 11/1986 Trudell ................... 280/166
4,750,753 A * 6/1988 Dezern ................ 280/164.1

FOREIGN PATENT DOCUMENTS

JP S60-127251 U 8/1985
KR 20-1999-0027578 U 7/1999

\* cited by examiner

*Primary Examiner* — Jeffrey J Restifo
*Assistant Examiner* — Erez Gurari
(74) *Attorney, Agent, or Firm* — Morgan, Lewis & Bockius LLP

(57) ABSTRACT

A bumper step for a heavy-duty truck includes a main bracket that is provided on a front lower portion of a vehicle. The lower end of a first step is hinged to the main bracket such that the first step is rotatable and deployable downwards, and the first step is fixed in a deployed position. A second step is provided behind the first step. The upper end of the second step is hinged to the main bracket such that the second step is rotatable and deployable upwards. The second step is fixed in position above the first step.

8 Claims, 6 Drawing Sheets

BUMPER STEP FOR HEAVY-DUTY TRUCK

CROSS-REFERENCE TO RELATED APPLICATIONS

The present application claims priority of Korean Patent Application Number 10-2011-0134664 filed Dec. 14, 2011, the entire contents of which application is incorporated herein for all purposes by this reference.

BACKGROUND OF INVENTION

1. Field of Invention

The present invention relates, in general, to a bumper step for a heavy-duty truck, and more particularly, to a bumper step for a heavy-duty truck, in which the width of the step on which the feet are intended to be put is increased, and steps are provided in upper and lower positions without limiting the design of the front part of a vehicle, so that maintenance can be performed without hindrance.

2. Description of Related Art

Generally, the height of a heavy-duty truck such as a dump truck is much higher than that of an automobile. It is therefore difficult to clean dirt from the windshield or to perform maintenance on the front part of the truck, for example, to replace a wiper blade.

Accordingly, the bumper of the truck is provided with a step at a predetermined height so that a worker can perform maintenance on the front part of the truck by ascending onto the step.

FIG. 1 is a view showing the structure of a bumper step of the related art, which is provided on a heavy-duty truck. As shown in FIG. 1, a bumper cover has a step-hole 1 formed in the horizontal direction thereof, so that a worker can stand on the step-hole 1.

However, the step-hole 1 of the bumper step is poorly designed for an worker to step on since the width on which the worker can stand is narrow. Therefore, conducting maintenance on the front part is disadvantageously difficult, and the operation encounters considerable restrictions.

FIG. 2 is a view showing the structure of another bumper step of the related art that is opened. As shown in FIG. 2, a bumper is provided with a grilled step 2 in the central portion thereof. The lower end of the step 2 is hinged to the bumper so that it can be opened and closed like a hinged door.

This bumper step has a wide area on which the feet are intended to be put, so that work can be easily performed. However, the height of the step is low, and thus it is difficult to perform maintenance on the upper portion of the windshield.

FIG. 3 is a view showing the structure of a further example of the bumper step of the related art that is opened. As shown in FIG. 3, an upper step 3 and a lower step 4 are provided in the upper and lower ends of the central portion of a bumper, respectively. The lower end of the steps is hinged to the bumper, so that the steps can be opened and closed like a hinged door.

In this example, the upper step increases the height of the entire step structure, such that an operation on the upper portion of the windshield can be easily carried out. However, since the two steps are provided at the upper and lower ends of the bumper, respectively, the width of the area of the step on which feet are intended to be put is decreased. This causes a problem in that maintenance work cannot be easily carried out.

In addition, since the two steps are provided on the upper and lower ends of the bumper, respectively, the area in which the steps are provided must be considerably large. This disadvantageously limits the design of the front part of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present application are directed to provide solutions to the above problems occurring in the related art, and the present application is intended to propose a bumper step for a heavy-duty truck, in which the width of the step on which feet are intended to be put is increased, and steps are provided in upper and lower positions without limiting the design of the front part of a vehicle, so that maintenance can be easily performed.

Various aspects of the present invention provide for a bumper step for a heavy-duty truck that includes a main bracket provided on a front lower portion of a vehicle, a first step, wherein a lower end of the first step is hinged to the main bracket such that the first step is rotatable and deployable downwards, and the first step is fixed in a deployed position, and a second step provided behind the first step, wherein an upper end of the second step is hinged to the main bracket such that the second step is rotatable and deployable upwards, and the second step is fixed in position above the first step.

The bumper step may include a first mount bracket provided on the main bracket, the first mount bracket having a first stopper that is bent on an upper end thereof, and a second mount bracket provided on the first step, wherein the second mount bracket is hinged to the first mount bracket on one end and has a second stopper on the other end, wherein the second stopper is bent such that the second stopper is held by the first stopper when the first step is deployed.

The first step may be connected to the main bracket via a gas lifter.

The bumper step may include a third mount bracket provided on the main bracket, a rotary shaft-hole formed on an upper portion of the third mount bracket and extending forwards and backwards in a lengthwise direction of the vehicle, a movable shaft-hole formed in one portion of the third mount bracket along a radius of rotation of the second step, the movable shaft-hole having a locking-hole in an upper end thereof, and the locking-hole extending forwards and backwards in the lengthwise direction of the vehicle, a rotary shaft provided on one end of the second step, wherein the rotary shaft is hinged to the rotary shaft-hole, and is configured such that the rotary shaft moves forwards and backwards along the rotary shaft-hole when the second step is operated to be moved, and a movable shaft provided on the second step, wherein the movable shaft is fitted into and guided by the movable shaft-hole, and is held by the locking-hole when the second step is operated to be moved.

A locking projection may be formed in a lower intersection between the movable shaft-hole and the locking-hole for assisting stabilization of the second step.

When the first step and the second step are folded, the upper end of the second step may be located below the upper end of the first step.

A first insert member may be provided in the first step and a first elastically deformable member may be provided in a portion of the main bracket that faces the first insert member. When the first step is folded, the first insert member may be inserted into the first elastically deformable member, so that the first step is fixed in position.

A second insert member may be provided on the second step and a second elastically deformable member may be provided in a portion of the main bracket that faces the second insert member. When the second step is folded, the second insert member may be inserted into the second elastically deformable member, so that the second step is fixed in position.

A first insert member and a second insert member may be provided to fix the positions of the first step and the second step in folded states, respectively, each of the first and second insert members having a distal end that has substantially a form of a spherical protrusion. First and second elastically deformable members may be elastically deformed almost instantaneously at opening and closing of the first and second steps when the first and second insert members are inserted into or released from the first and second elastically deformable members, respectively.

According to various aspects of the present application, since the first step can be deployed independently from the second step, it is possible to use only the first step or use both the first step and the second step as required, thereby increasing the convenience of the use of the bumper step.

Furthermore, the second step may be designed such that it is folded to the position behind the first step instead of the position above the first step, so that the area in the upper portion of the first step in which the second step is intended to be provided becomes unnecessary. This can consequently increase the degree of design freedom of the bumper step, and the width of the first step on which the feet are intended to be put can be wide, so that a person can have firmer footing when standing on the first step.

In addition, the second step may be deployed by rotating about its upper end, so that the height of the second step on which the feet are intended to be put is further increased. Consequently, a person can more easily carry out maintenance with firmer footing. Moreover, since the second step employs a simple two-shaft hinge structure, opening and closing it can be more easily and simply carried out.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 4 to FIG. 10, a bumper step for a heavy-duty truck according to various embodiments of the present application includes main brackets 10, a first step 20 and a second step 30. The main brackets 10 are provided in the front lower portion of a vehicle. The lower end of the first step 20 is hinged to the main brackets 10, such that the upper end of the first step 20 is rotated and deployed downwards. Thereby, the first step 20 can be fixed in the deployed position. The second step 30 is provided behind the first step 20, and the upper end of the second step 30 is hinged to the main brackets 10, such that the lower end of the second step 30 is rotated and deployed upwards. Thereby, the second step 30 can be fixed in position above the first step 20.

Here, the main brackets 10 are provided respectively on both sections of the main body of the vehicle that are connected to a bumper in the front part of the vehicle, and may extend in the vertical direction.

The first step 20 is hinged to the lower portion of the main brackets 10, and the second step 30 is hinged to the upper portion of the first step 20. The second step 30 may be provided in the folded state behind the first step 20. The first step 20 is deployed while rotating downwards, and the second step 30 is deployed while rotating upwards. Accordingly, the first step 20 can be used independently from the second step 30, and the second step 30 can be used by being deployed as required.

In particular, since the second step 30 is folded behind the first step 20 instead of above the first step 20, the area in the upper portion of the first step 20 in which the second step 30 is intended to be provided is no longer required, such that the width of the first step 20 can be designed to be wide. This contributes to an increase in the area of the first step 20 on which the feet are intended to be put, so that a worker can have firmer footing when standing on the first step 20.

Furthermore, the second step 30 is deployed by rotating about the upper end thereof. When the second step 30 is deployed, the height of the second step 30 on which the feet are intended to be put is further increased. Therefore, conducting repair work on the upper portion of the windshield can be carried out more stably.

Figure 1:
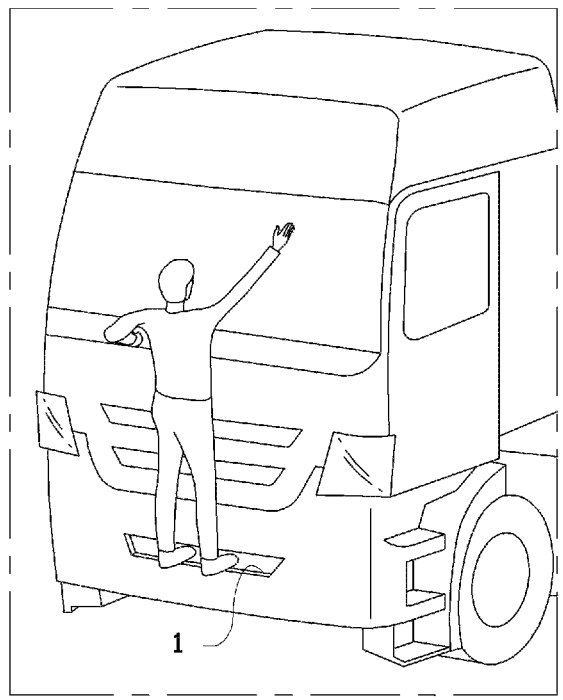
FIG. 1 illustrates the structure and use of a bumper step of the related art.
Figure 2:
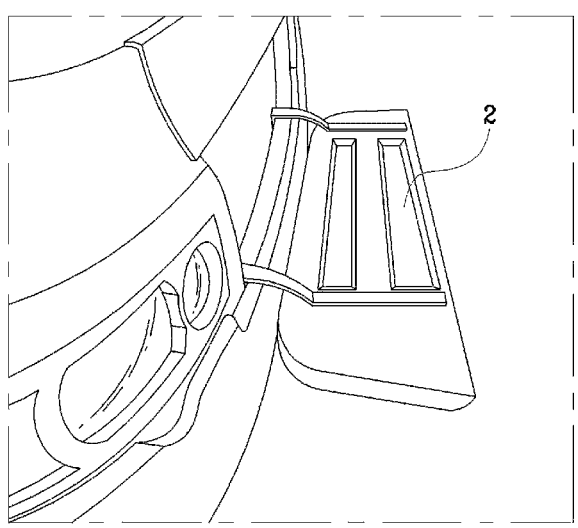
FIG. 2 shows the structure of another bumper step of the related art that is opened.
Figure 3:
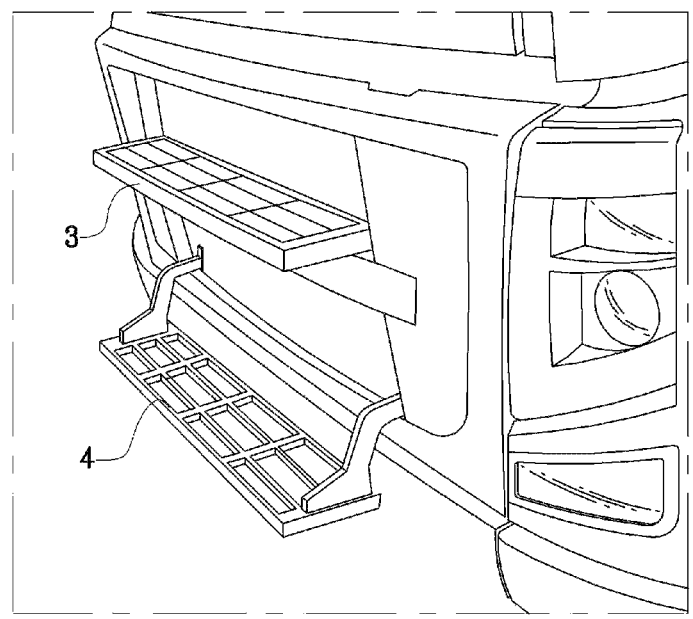
FIG. 3 shows the structure of another bumper step of the related art that is opened.
Figure 4:
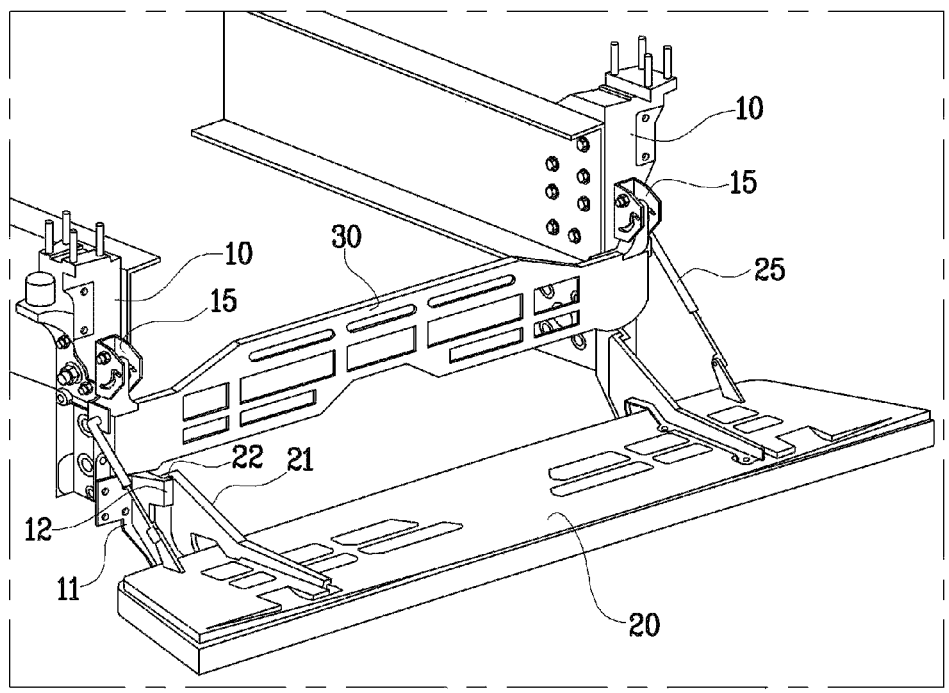
FIG. 4 illustrates an exemplary bumper step in which a first step is deployed according to the present application.
Figure 9:
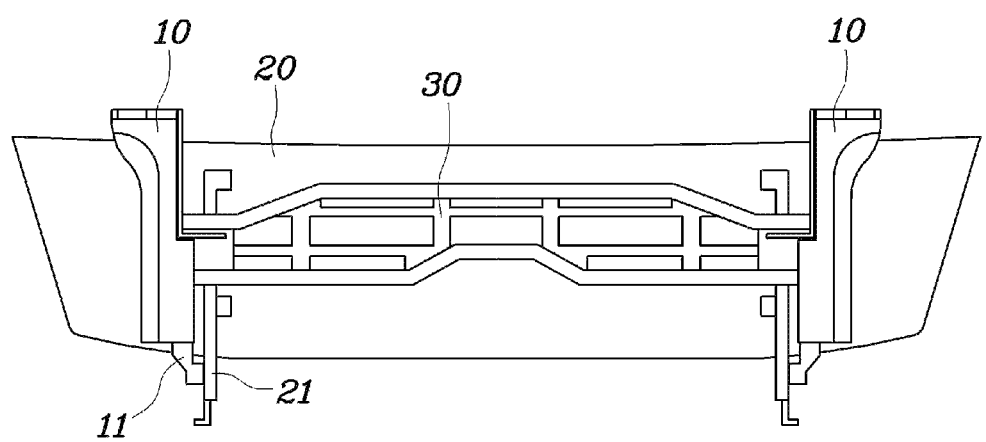
FIG. 9 is a rear view of the bumper step shown in FIG. 4, in which the first and second steps are folded.
Figure 10:
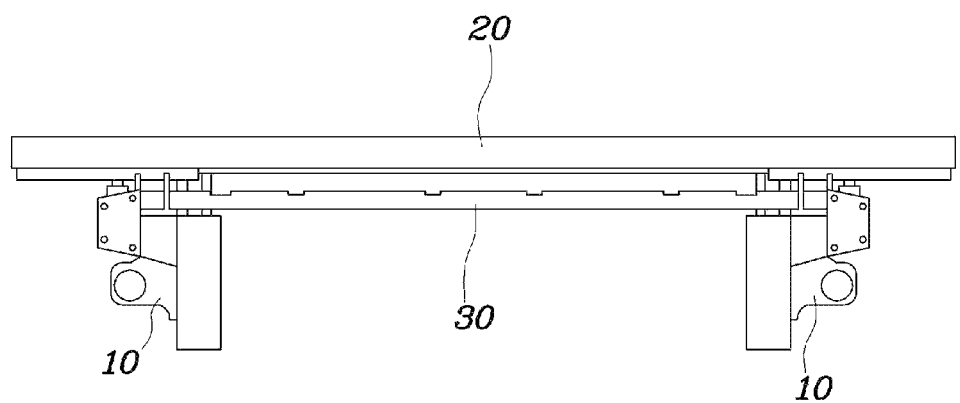
FIG. 10 is a top view of the bumper step shown in FIG. 4, in which the first and second steps are folded.

In addition, with reference to FIG. 4 and FIG. 9, the structure for coupling the first step 20 may include first mount brackets 11 and second mount brackets 21. Each first mount bracket 11 is provided on a respective one of the main brackets 10, and has a first stopper 12 that is bent on the upper end thereof. Each second mount bracket 21 is provided on the first step 20, has one end thereof hinged to the first mount bracket 11. A second stopper 22 is bent on the other end of the second mount bracket 21, such that the second stopper 22 is held by the first stopper 12 when the first step 20 is deployed.

The first mount bracket 11 is configured such that it protrudes forwards from the lower end of the main bracket 10. The second mount bracket 21 is configured such that it surrounds the rear surface and the underside of the first step 20. The lower end of the second mount bracket 21 is hinged to the front lower portion of the first mount bracket 11.

Since the first mount bracket 11 and the second mount bracket 21 are hinged to each other, the first step 20 is provided in front of the second step 30, so that the second step 30 can be provided behind the first step 20 irrespective of the position of the first step 20.

Since the bended first stopper 12 and the second stopper 22 extend from the first mount bracket 11 and the second mount bracket 21, respectively, the first step 20 can be fixed at a predetermined position when the first step 20 is deployed.

Figure 6:
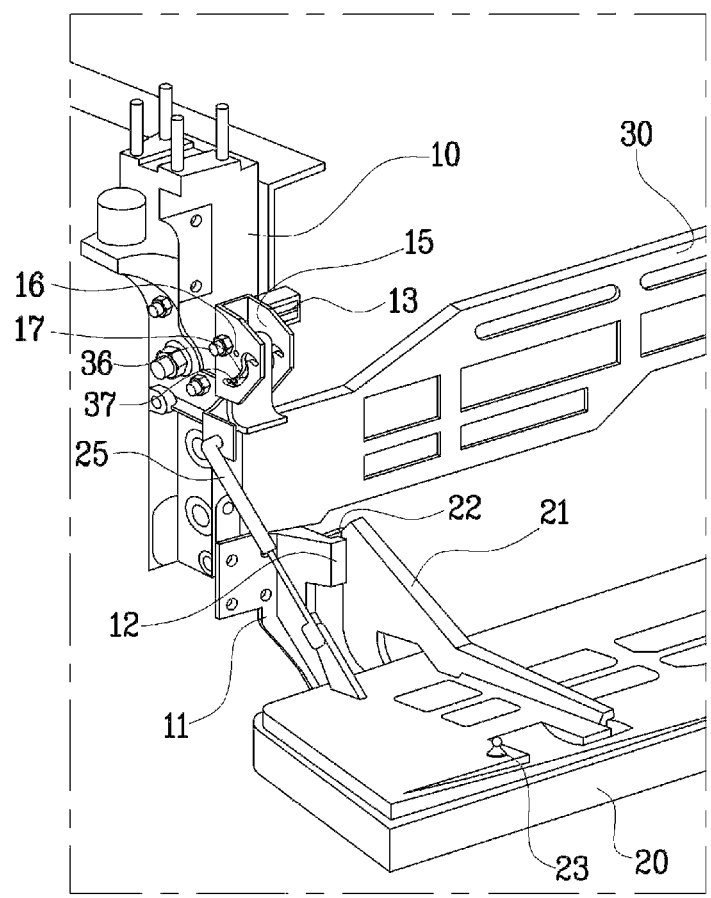
FIG. 6 is an enlarged view showing the fastened state of the gas lifter, the first insert member and the first elastically deformable member in the bumper step shown in FIG. 4.
Figure 7:
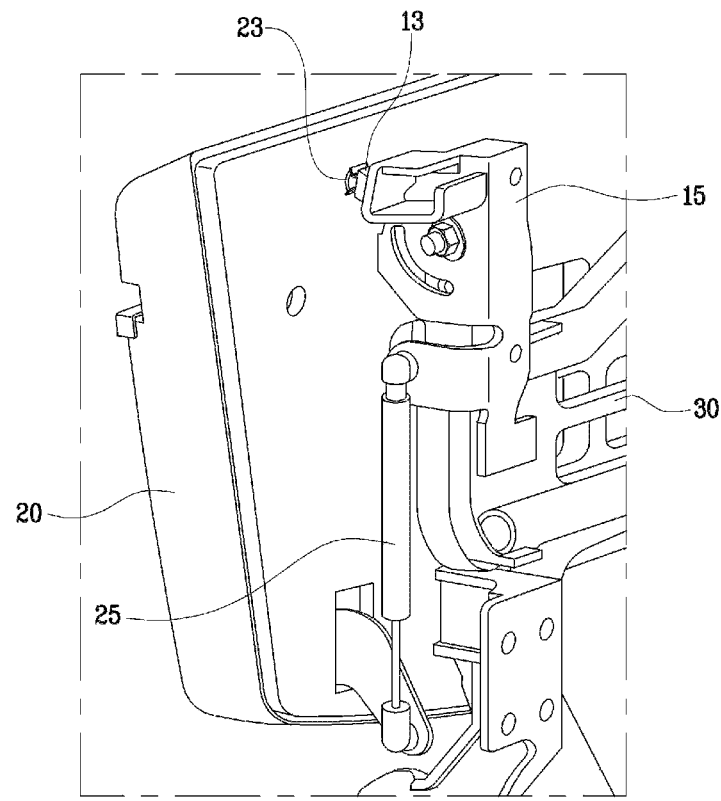
FIG. 7 illustrates the first step of the bumper step shown in FIG. 4, where the first step is folded and fixed in position.

Furthermore, as shown in FIG. 6, the first step 20 in various embodiments can be connected to the main bracket 10 via a gas lifter 25. One end of the gas lifter 25 is hinged to the rear surface of the first step 20, and the other end of the gas lifter 25 is hinged to the main bracket 10. Suitably, the other end of the gas lifter 25 may be hinged to a third mount bracket 15, which is fixed to the main bracket 10. However, in various embodiments it may be directly hinged to the main bracket 15 depending on the shape of the main bracket 10.

Since the gas lifter 25 is connected to the first step 20 as described above, the compressing and expanding force of the gas lifter 25 can be used to prevent the first step 20 from being opened during driving when the first step 20 is folded. When the first step 20 is deployed, it is possible to close the first step 20 by applying a small amount of force thereto.

Figure 5:
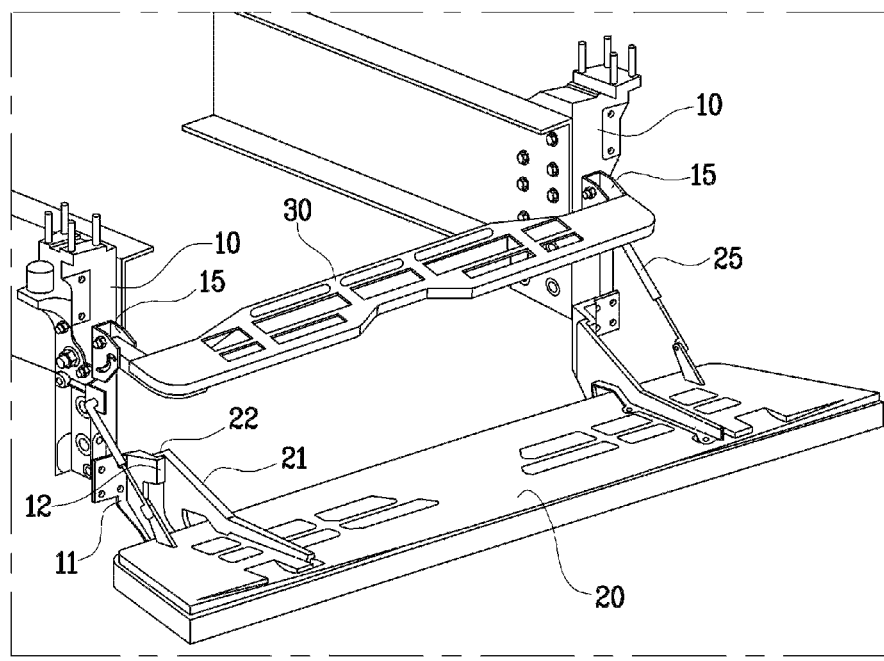
FIG. 5 shows the bumper step shown in FIG. 4, in which both first and second steps are deployed.
Figure 8:
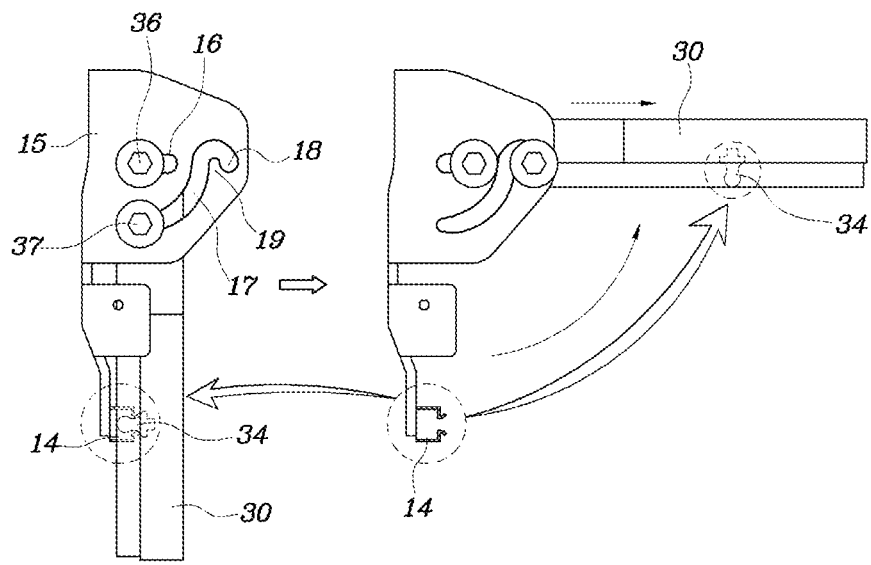
FIG. 8 shows the states of the second step of the bumper step shown in FIG. 4 before and after the second step has been opened.

With reference to FIGS. 4, 5 and 8, the coupling structure of the second step 30 in various embodiments may include the third mount bracket 15, a rotary shaft-hole 16, a movable shaft-hole 17, a rotary shaft 36 and a movable shaft 37. The third mount bracket 15 is provided on the main bracket 10. The rotary shaft-hole 16 is formed on the upper portion of the third mount bracket 15, and extends forwards and backwards in the lengthwise direction of the vehicle. The movable shaft-hole 17 is formed in one portion of the third mount bracket 15 along the radius of rotation of the second step 30, and has a locking-hole 18 in the upper end thereof, which extends forwards and backwards in the lengthwise direction of the vehicle. The rotary shaft 36 is provided on one end of the second step 30 and is hinged to the rotary shaft-hole 16. The rotary shaft 36 is configured such that it moves forwards and backwards along the rotary shaft-hole 16 when the second step 30 is operated and moved. The movable shaft 37 is provided on the second step 30. The movable shaft 37 is fitted into and guided by the movable shaft-hole 17, and is held by the locking-hole 18 when the second step 30 is operated and moved.

When the second step 30 is moved upwards while the lower portion thereof is being grasped, the movable shaft 37 rotates upwards along the movable shaft-hole 17 about the rotary shaft 36 up to the position of the locking-hole 18. Afterwards, when the second step 30 is pulled forwards, the rotary shaft 36 moves forwards along the rotary shaft-hole 16, so that the movable shaft 37 is introduced into the locking-hole 18, and thus the second step 30 is fixed in position.

Furthermore, in various embodiments of the present application, as shown in FIG. 8, a locking projection 19 may be formed in the lower intersection between the movable shaft-hole 17 and the locking-hole 18. When the second step 30 enters the locking-hole 18, it is held by the locking projection 19 between the movable shaft-hole 17 and the locking-hole 18. Consequently, when the second step 30 is deployed, it can be more reliably fixed in position.

As shown in FIG. 9, in various embodiments when the first step 20 and the second step 30 are folded, the upper end of the second step 30 may be located below the upper end of the first step 20.

That is, the second step 30 is designed within the range of the area of the first step 20. When viewed from the front, the second step 30 is not exposed on the upper end of the first step 20, since it is provided behind the first step 20. It is not necessary to consider the area in the upper portion of the first step 20 in which the second step 30 is intended to be provided. This can significantly decrease limiting factors in design, thereby increasing the degree of design freedom.

As shown in FIG. 6, in various embodiments, a first insert member 23 is provided in the first step 20 and a first elastically deformable member 13 is provided in the portion of the main bracket 10 that faces the first insert member 23. When the first step 20 is folded, the first insert member 23 can be inserted into the first elastically deformable member 13, so that the first step 20 is fixed in position.

In various embodiments the first insert member 23 is formed as a protrusion, with the distal end thereof being substantially spherical. The shape of the first elastically deformable member 13 may be that of a clip, so that it can be elastically deformed almost instantaneously at opening and closing when the end of the first insert member 23 is inserted thereinto or released therefrom.

In various embodiments the first elastically deformable member 13 may be suitably provided on the first mount bracket 15, which is fixed to the main bracket 10. In various embodiments it may be directly provided on the main bracket 10 depending on the shape of the main bracket 10.

In addition, as shown in FIG. 8, in various embodiments of the present application, a second insert member 34 is provided on the second step 30 and a second elastically deformable member 14 is provided in the portion of the main bracket 10 that faces the second insert member 34. When the second step 30 is folded, the second insert member 34 can be inserted into the second elastically deformable member 14, so that the second step 30 is fixed in position.

The second insert member 34 and the second elastically deformable member 14 are configured essentially the same as the first insert member 23 and the first elastically deformable member 13, which were described above. Therefore, a detailed description of the second insert member 34 and the second elastically deformable member 14 will be omitted.

A detailed description will be given below of the operation and effects of the present application.

In order to use the bumper step of the present application, a driver or a repairman grasps the upper end of the first step 20 and pulls it downwards by applying force. Then, the first insert member 23 is released from the first elastically deformable member 13, so that the first step 20 is deployed by rotating about the lower end thereof. Here, when the first step 20 is being opened, the compressing and expanding force of the gas lifter 25 can prevent the act of opening from causing an impact.

Afterwards, the second step 30 can be used as required by the user. When the user wants to use the second step 30, he/she pulls the second step 30 upwards by holding the lower end thereof. Then, the second insert member 34 is released from the second elastically deformable member 14, so that the second step 30 is deployed by rotating upwards about the rotary shaft 36 in the upper end thereof.

Here, the movable shaft 37 rotates while moving along the movable shaft-hole 17. When the movable shaft 37 rotates to the position of the locking-hole 18, it pulls the second step 30 forwards, so that the rotary shaft 36 moves along the rotary shaft-hole 16. Then, the movable shaft 37 is introduced into the locking-hole 18, so that the second step 30 is firmly fixed in position.

As described above, various embodiments of the present application are configured such that the first step 20 can be deployed independently from the second step 30, it is possible to use only the first step 20 or use both the first step 20 and the second step 30 as desired, thereby increasing the fitness for use of the bumper step.

In particular, various embodiments of the present application are designed such that the second step 30 is folded to the position behind the first step 20 instead of to the position above the first step 20, it is unnecessary to provide an area in the upper portion of the first step 20 for accommodating the second step 30. The upper portion of the second step 30 is not exposed on the upper end of the first step 20. Therefore, the width of the first step 20 on which the feet are intended to be put can be wide so that a person can have firmer footing when standing on the first step 20. Since it is not necessary to provide an area in the upper portion of the first step 20 for accommodating the second step 30, the degree of design freedom can be increased.

In addition, in various embodiments of the present application, the second step 30 is deployed by rotating about its upper end, so that the height of the second step 30 on which the feet are intended to be put is further increased. This can consequently help a person have better footing when standing on the first step, so that maintenance work can be more easily carried out with firmer footing.

Furthermore, in various embodiments of the present application, the second step 30 employs a simple two-shaft hinge structure, such that opening and closing it can be more easily and simply carried out.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper step for a heavy-duty truck comprising:
a main bracket provided on a front lower portion of a vehicle;
a first step, wherein a lower end of the first step is hinged to the main bracket such that the first step is rotatable and deployable downwards, and the first step is fixed in a deployed position;
a second step provided behind the first step, wherein an upper end of the second step is hinged to the main bracket such that the second step is rotatable and deployable upwards, and the second step is fixed in position above the first step;
a first mount bracket provided on the main bracket, the first mount bracket having a first stopper that is bent on an upper end thereof; and
a second mount bracket provided on the first step, wherein the second mount bracket is hinged to the first mount bracket on one end and has a second stopper on the other end, wherein the second stopper is bent such that the second stopper is held by the first stopper when the first step is deployed.

2. The bumper step of claim 1, wherein the first step is connected to the main bracket via a gas lifter.

3. The bumper step of claim 1, further comprising:
a third mount bracket provided on the main bracket;
a rotary shaft-hole formed on an upper portion of the third mount bracket and extending forwards and backwards in a lengthwise direction of the vehicle;
a movable shaft-hole formed in one portion of the third mount bracket along a radius of rotation of the second step, the movable shaft-hole having a locking-hole in an upper end thereof, and the locking-hole extending forwards and backwards in the lengthwise direction of the vehicle;
a rotary shaft provided on one end of the second step, wherein the rotary shaft is hinged to the rotary shaft-hole, and is configured such that the rotary shaft moves forwards and backwards along the rotary shaft-hole when the second step is operated to be moved; and
a movable shaft provided on the second step, wherein the movable shaft is fitted into and guided by the movable shaft-hole, and is held by the locking-hole when the second step is operated to be moved.

4. The bumper step of claim 3, wherein a locking projection is formed in a lower intersection between the movable shaft-hole and the locking-hole for assisting stabilization of the second step.

5. The bumper step of claim 1, wherein the upper end of the second step is located below an upper end of the first step when the first step and the second step are folded.

6. The bumper step of claim 1, wherein a first insert member is provided in the first step and a first elastically deformable member is provided in a portion of the main bracket that faces the first insert member, and when the first step is folded, the first insert member is inserted into the first elastically deformable member so that the first step is fixed in position.

7. The bumper step of claim 1, wherein a second insert member is provided on the second step and a second elastically deformable member is provided in a portion of the main bracket that faces the second insert member, and when the second step is folded, the second insert member is inserted into the second elastically deformable member so that the second step is fixed in position.

8. The bumper step of claim 1, further comprising:
a first insert member and a second insert member, wherein the first insert member and the second insert member are provided to fix positions of the first step and the second step in folded states, respectively, each of the first and second insert members having a distal end that has substantially a form of a spherical protrusion; and
first and second elastically deformable members, wherein the first and second elastically deformable members are elastically deformed almost instantaneously at opening and closing of the first and second steps when the first and second insert members are inserted into or released from the first and second elastically deformable members, respectively.

* * * * *